W. M. Bingham & H. Bemis,
Self-Watering Vase.

116401                      PATENTED JUN 27 1871

Witnesses.
John S Brooks
Wm Irwin

Inventors.
Wm M Bingham
Henry Bemis

UNITED STATES PATENT OFFICE.

WILLIAM M. BINGHAM AND HENRY BEMIS, OF ROCHESTER, NEW YORK.

IMPROVEMENT IN SELF-WATERING VASES.

Specification forming part of Letters Patent No. 116,401, dated June 27, 1871.

*To all whom it may concern:*

Be it known that we, WILLIAM M. BINGHAM and HENRY BEMIS, of the city of Rochester and State of New York, have invented a Self-Watering Vase; and we do hereby declare that the following is a full and exact description thereof, reference being had to the accompanying drawing and to the letters of reference marked thereon, in which—

Figure 1:
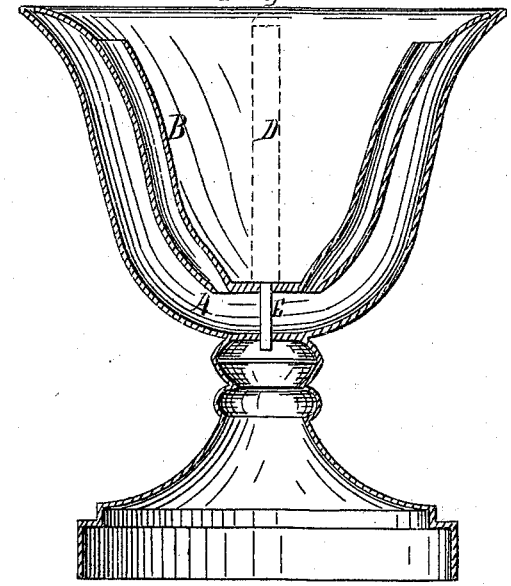
Figure 2:
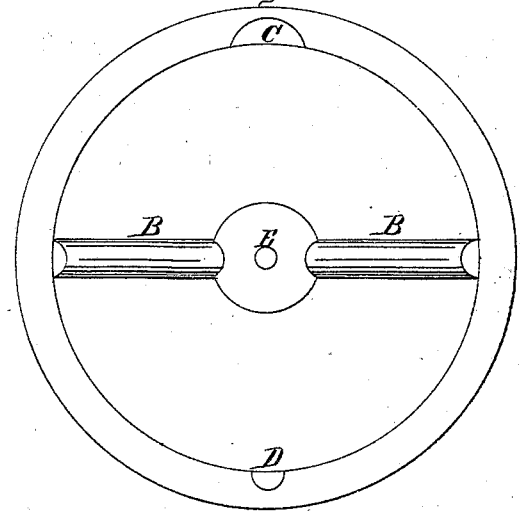

Figure 1 is a sectional elevation through the center of the vase, and Fig. 2 is a top view.

Our vase may be constructed in any form to suit the taste of the manufacturer, and is provided with an inner wall forming the water-space A, which should be of such proportions as to leave a space for a reasonable supply of water to keep the earth moist for from two to four weeks' time. The pipes B communicate the water to the earth, and should be filled with sponge or some equivalent substance that will raise the water from the bottom by capillary attraction. The opening C is for the purpose of filling the space with water. The pipe D is an overflow-pipe. The pipe E is the usual drain-pipe.

The object of our invention is to provide a vase, at a little additional cost to those now in use, which can be supplied with water by its own action after the reservoir is once filled, and thus save much trouble and time now required to take care of plants in vases used to decorate cemetery lots or other places remote from the residence of the owner. A common rain-shower will fill it, so that, if rain occurs once in twenty days, it will need no other watering for a whole season, and, even if empty in the space for water, it will keep the earth moist longer than a single-wall vase, being protected at the sides from the action of the sun.

It is well known that the ordinary vase requires plants to be watered at least once in a week in summer, and this prevents many persons from keeping them, when, were it not for the impossibility of attending to them, they would be glad to use such beautiful ornaments on their grounds.

What we claim as our invention, and desire to secure by Letters Patent, is—

A vase or flower-pot, having double walls for providing a reservoir for water or air, and the necessary pipes, shown at B, D, and E, for the purposes specified, when constructed substantially as described.

WM. M. BINGHAM.
HENRY BEMIS.

Witnesses:
  JOHN S. BROOKS,
  WILLIAM IRWIN.